United States Patent
Adams

(10) Patent No.: US 8,704,852 B2
(45) Date of Patent: Apr. 22, 2014

(54) METHODS FOR GENERATING ONE OR MORE COMPOSITE IMAGE MAPS AND SYSTEMS THEREOF

(75) Inventor: Kyle Adams, West Henrietta, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 1175 days.

(21) Appl. No.: 12/284,780

(22) Filed: Sep. 25, 2008

(65) Prior Publication Data

US 2010/0073381 A1 Mar. 25, 2010

(51) Int. Cl.
*G09G 5/00* (2006.01)
*G06F 17/00* (2006.01)

(52) U.S. Cl.
USPC ........... 345/629; 345/634; 345/660; 345/676; 715/204; 715/208; 715/234

(58) Field of Classification Search
None
See application file for complete search history.

(56) References Cited

U.S. PATENT DOCUMENTS

2006/0200751 A1* 9/2006 Underwood et al. ...... 715/501.1
2009/0248831 A1* 10/2009 Scott et al. .................... 709/217

OTHER PUBLICATIONS

"Cascading Style Sheets, level 2 CSS2 Specification", W3C Recommendation May 12, 1998, Chapter 14 Colors and Backgrounds, http://web.archive.org/web/20070918021613/http://www.w3.org/TR/CSS2/colors.html.*

* cited by examiner

*Primary Examiner* — Tize Ma
(74) *Attorney, Agent, or Firm* — Shumaker & Sieffert, P.A.

(57) ABSTRACT

A method, computer readable medium, and system for generating a composite image map includes obtaining a plurality of sprites for an application page and determining coordinates of each of the obtained plurality of sprites. A composite image map is generated based on the obtained plurality of sprites and the determined coordinates.

24 Claims, 2 Drawing Sheets

US 8,704,852 B2

METHODS FOR GENERATING ONE OR MORE COMPOSITE IMAGE MAPS AND SYSTEMS THEREOF

FIELD OF THE INVENTION

The present invention generally relates to image management methods and systems and, more particularly, to methods for generating one or more composite image maps and systems thereof.

BACKGROUND

The increase in broadband penetration and emerging web-based application development technologies have helped to usher in a new era of web-based applications. These applications are becoming increasingly sophisticated, as web application developers attempt to replicate the functionality, speed, and user interface of desktop applications.

In web application development, most applications use large quantities of images on each application page. These application pages are often informative and aesthetically pleasing, but the images for these application pages are time consuming to download. First, these images increase the bandwidth required to use the application and drive up costs of hosting the applications. More importantly, much time is spent establishing individual HTTP connections between the requesting browser and the server. Additionally, some applications are implemented in such a way, that if all images are not present from the beginning, at least some of the missing images may be requested multiple times and in some cases, hundreds of times.

One solution to this problem has been the consolidation of all images on an application page into one or a few binary files. Traditionally, these image maps have been created using image editing programs which have allowed developers to manually position their images within an image map for the application page.

Although these image maps are helpful, they require significant manual effort to create. Further, they require additional effort to introduce new images and to remove or change existing ones from an image map for an application page. If an image is removed, it shifts the locations of images below it, requiring updates to the application page in order to reference the new locations within the image map. Accordingly, when dealing with a large scale application, developed by several parties and incorporating a large number of image files, it becomes very impractical to manage these image maps.

The huge amount of manual labor required to generate and modify image maps, makes them very expensive for developers to implement. Further, they are time consuming to generate and update, slowing down the development of each new build of the software. There is a huge need for a solution that automates the creation and updating of image maps.

SUMMARY

A method for generating a composite image map in accordance with embodiments of the present invention includes obtaining a plurality of sprites for an application page and determining coordinates of each of the obtained plurality of sprites. A composite image map is generated based on the obtained plurality of sprites and the determined coordinates.

A computer readable medium having stored thereon instructions for generating a composite image map comprising machine executable code which when executed by at least one processor in accordance with other embodiments of the present invention includes obtaining a plurality of sprites for an application page and determining coordinates of each of the obtained plurality of sprites. A composite image map is generated based on the obtained plurality of sprites and the determined coordinates.

A composite image map generation system in accordance with other embodiments of the present invention includes a coordinate determination system and a composition system. The coordinate determination system determines coordinates of each of a plurality of sprites for an application page. The composition system generates a composite image map based on the plurality of sprites and the determined coordinates The present invention provides a more effective method and system for generating one or more composite image maps for an application page. With the present invention, developers only need to maintain XML files which define the composition of their composite image maps. When a new sprite is added, removed, or changed, the XML file is the only item which must be updated. When the composite image mapping processor is invoked, the XML file is utilized by the composite image mapping processor to compile the various sprites in the intended configuration. This process replaces individual sprite references within the application with references into the resulting composite image maps. As a result, the present invention provides developers two seemingly identical environments. In the development environment, sprites are stored in individual dedicated files and are referenced as such. In the production environment, all sprites are stored in a series of composite image maps along with their map coordinates. The granularity provided by individual files will speed up development, as composite image maps will not need to be recompiled in order to test changes. The individual nature of the images in the development environment also will allow graphic designers to make changes to a single image without recompiling the composite image map. The production environment however will not waste time downloading individual files for each image, but instead only download one or larger image files. This optimization shaves a significant amount of time from the resulting applications load/initialization time, as well as avoids having to download the image multiple times due to browser inconsistencies.

DETAILED DESCRIPTION

Figure 1:
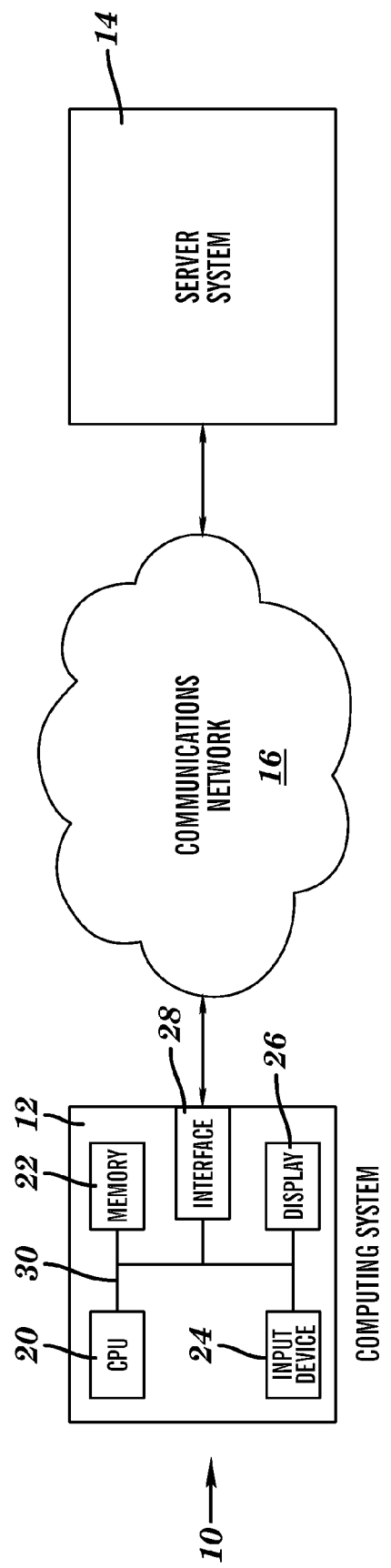
FIG. 1 is a block diagram of a system that generates a composite image map in accordance with embodiments of the present invention.

A system 10 that generates a composite image map in accordance with embodiments of the present invention is illustrated in FIG. 1. The system 10 includes a computing system 12, a server system 14, and a communication network 16, although the system 10 can include other types and numbers of components connected in other manners. The present invention provides a more effective method and system for generating a composite image for an application page.

Referring more specifically to FIG. 1, the computing system 12 is used to generate a composite image map and to display the resulting composite image for an application page, although other types and numbers of systems could be used, such as server system 14, and other types and numbers of functions can be performed by the computing system. The computing system 12 includes a central processing unit (CPU) or processor 20, a memory 22, user input device 24, a display 26, and an interface system 28, and which are coupled together by a bus 30 or other link, although the computing system 12 can include other numbers and types of components, parts, devices, systems, and elements in other configurations. The processor 20 executes a program of stored instructions for one or more aspects of the present invention as described and illustrated herein, although the processor could execute other numbers and types of programmed instructions.

The memory 22 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory 22.

The user input device 24 in the computing system 12 is used to input selections, such as request to generate a composite image map or to display a resulting composite image for an application page, although the user input device 24 could be used to input other types of data and interact with other elements. The user input device 24 can include a computer keyboard and a computer mouse, although other types and numbers of user input devices can be used. The display 26 in the computing system 12 is used to show data and information to the user, such as a resulting composite image for an application page by way of example only. The display 26 can include a computer display screen, such as a CRT or LCD screen, although other types and numbers of displays could be used.

The interface system 28 is used to operatively couple and communicate between the computing system 12 and the server system 14 over a communication network 16, although other types and numbers of communication networks or systems with other types and numbers of connections and configurations to other types and numbers of systems, devices, and components can be used. By way of example only, the communication network 16 can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

The server system 14 is a web server which also can be used to generate a composite image map, although other types of servers or computing systems could be used and the server system can perform other types and numbers of functions. The server system 14 includes a central processing unit (CPU) or processor, a memory, and an interface system which are coupled together by a bus or other link, although other numbers and types of each of the components and other configurations and locations for the components can be used. The processor in server system 14 executes a program of stored instructions for one or more aspects of the present invention as described herein. The memory in server system 14 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for the memory in server system 14. The interface system in server system 14 is used to operatively couple and communicate between the server system 14 and the computing system 12, although other types of connections and other types and combinations of systems could be used.

Although embodiments of the computing system 12 and server system 14 are described and illustrated herein, the computing system and server can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
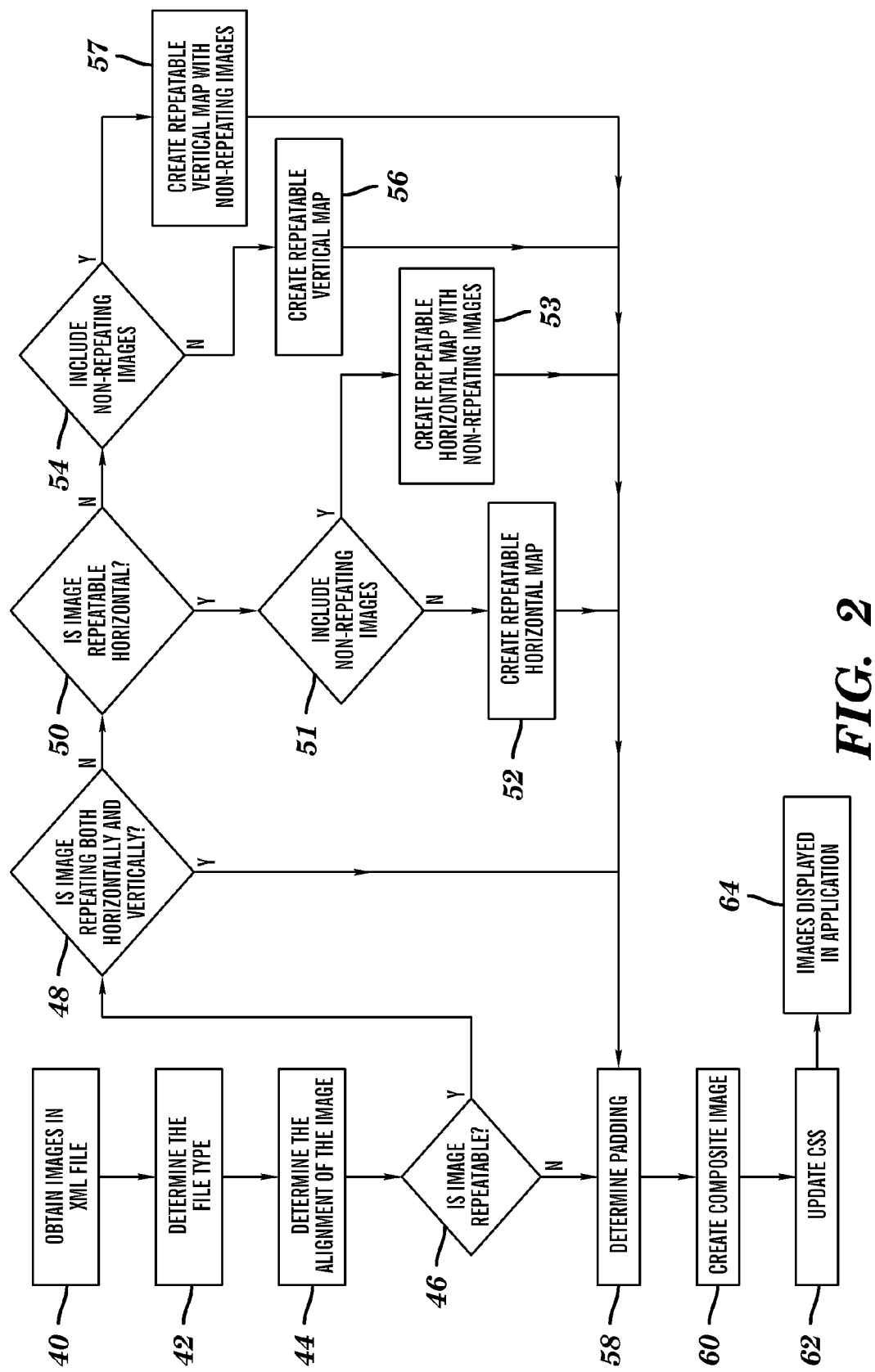
FIG. 2 is a flow chart of a method for generating a composite image using the image map in accordance with embodiments of the present invention.

The method for generating a composite image map for an application page in accordance with the exemplary embodiments will now be described with reference to FIGS. 1-2. In these embodiments, a composite image map comprises one or more sprites along with a coordinate map for the one or more sprites, although the composite image map can comprise other numbers and types of elements. Although in this particular example, the processing steps described herein are executed by the computing system 12, some or all of these steps can be executed by other systems, devices, or components, such as by server system 14.

In step 40, the computing system 12 retrieves from the server system 14 an XML file with the sprites for the application, although sprites can be obtained in other manners. Each of the obtained sprites has a marker containing a unique identifier, a location, and one or more attributes, although each of the sprites could have other types and amounts of information. By way of example only the one of the attributes can be padding for the sprite, although the marker can have other types of attributes.

In step 42, the computing system 12 determines the file types of the obtained sprites for the application page, although the file type information can be determined in other manners. By way of example only, the obtained sprites for the application page are sorted into PNG, GIF and JPEG images. In an alternative embodiment, once the computing system 12 determines the file types of the obtained sprites, the computing system 12 can convert the obtained sprites which are not in a desired file type format to that file type, although the obtained sprites can be converted to other numbers of file types, such as two different file types.

In step 44, the computing system 12 determines the alignment of the obtained sprites for the application page based on an XML attribute associate with each sprite, although other manners for obtaining the alignment of the obtained sprites can be used. Once the alignment for the obtained sprites has been determined, the computing system 12 sorts the sprites based on repeat direction and file type, although other manners for organizing the sprites can be used.

In step 46, the computing system 12 determines if any of the obtained sprites for the application page are repeatable, although other manners for determining if the obtained images are repeatable could be used. If any of the obtained sprites for the application page are repeatable, then the Yes branch is taken to step 48.

In step 48, the computing system 12 determines if the obtained sprites for the application page are repeatable both horizontally and vertically, although other manners for determining if the obtained sprites are both horizontally and vertically repeatable could be used. If the obtained sprites for the application page are both horizontally and vertically repeatable, then the Yes branch is taken to step 58. If the obtained sprites for the application page are not both horizontally and vertically repeatable, then the No branch is taken to step 50.

In step 50, the computing system 12 determines if any of the obtained sprites for the application page are horizontally repeatable, although other manners for determining if any of the obtained sprites are horizontally repeatable could be used. If any of the obtained sprites for the application page are horizontally repeatable, then the Yes branch is taken to step 51.

In step 51, with respect to any non-repeating sprites in the obtained sprites, the computing system 12 determines whether the non-repeating sprites are going in a repeatable horizontal composition map based on operator input, although other manners for determining where the non-repeating sprites are placed and how the non-repeating sprites are handled can be used, such as based on a decision stored in memory can be used.

If in step 51 the computing system 12 determines the non-repeating sprites are not going in the repeatable horizontal composition image map, then the No branch is taken to step 52. In step 52, the computing system 12 creates a repeatable horizontal composition image map for the obtained images which are horizontally repeatable, although other manners for generating the horizontal composition image map can be used.

If in step 51 the computing system 12 determines the non-repeating sprites are going in the repeatable horizontal composition image map, then the No branch is taken to step 53. In step 53, the computing system 12 creates a repeatable horizontal composition image map for the obtained sprites which are horizontally repeatable and for the non-repeating sprites, although other manners for generating this horizontal composition image map can be used.

If in step 50 the obtained sprites for the application page are not horizontally repeatable, then the No branch is taken to step 54. In step 54, with respect to any non-repeating sprites in the obtained sprites, the computing system 12 determines whether the non-repeating sprites are going in a repeatable vertical composition image map based on operator input, although other manners for determining where the non-repeating sprites are placed and how the non-repeating sprites are handled can be used, such as based on a decision stored in memory can be used.

If in step 54 the computing system 12 determines the non-repeating sprites are not going in the repeatable vertical composition image map, then the No branch is taken to step 56. In step 56, the computing system 12 creates a repeatable vertical composition image map for the obtained sprites which are vertically repeatable, although other manners for generating the vertical composition image map can be used.

If in step 54 the computing system 12 determines the non-repeating sprites are going in the repeatable vertical composition image map, then the No branch is taken to step 57. In step 57, the computing system 12 creates a repeatable vertical composition image map for the obtained sprites which are vertically repeatable and for the non-repeating sprites, although other manners for generating this vertical composition image map can be used.

In step 58, the computing system 12 determines padding for each of the sprites in the composite image map by an XML attribute associated with each image, although other manners for determining padding can be used. The composite image map which is being processed can be one of both horizontally and vertically repeating, only horizontally repeating, only vertically repeating, and neither horizontally nor vertically repeating.

In step 60, the computing system 12 creates the composite image map for the application page based on the obtained sprites, the determined file types, the determined alignment of the obtained sprites, any repeatable horizontal composition image map or repeatable vertical composition image map, and the determined padding, although other types and amounts of information can be used to create the composite image map and other manners for creating the composite image map for the application page can be used.

In step 62, when in a production mode, a cascading style sheet (CSS) for the application page is updated by replacing markers containing the unique identifier for each sprite with the relevant composite image map and the location within the composite image map. When in a development mode, the markers in the CSS are replaced by the location of the actual individual images.

In step 64, with the composite image map the computing system 12 displays the resulting composite image for the application page on the display 26.

Accordingly, as described and illustrated by the exemplary embodiment herein the present invention provides a more effective method and system for generating a composite image for an application page.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method of generating a development environment and a production environment with web development software, the method comprising:

processing, with the web development software, an extensible markup language (XML) file to identify a plurality of sprites stored in individual files that are each individually referenced for use within an application page;

obtaining the plurality of sprites referenced for the application page;

generating one or more composite images based upon the obtained plurality of sprites, wherein the one or more composite images each comprises a single image containing at least one of the obtained plurality of sprites;

determining coordinates of each of the obtained plurality of sprites, wherein the coordinates define a location of each of the obtained plurality of sprites within the one or more composite images;

generating a composite image map based on the one or more composite images and the determined coordinates;

compiling, with the web development software operating in a production mode, the application page to automatically produce the production environment by modifying a cascading style sheet (CSS) associated with the application to replace markers containing unique identifiers for the sprites with markers containing a unique identifier for the composite image map and a location within the composite image map for the corresponding sprite; and compiling, with the web development software operating in a development mode, the application page to automatically produce the development environment by modifying the CSS to replace the each of the markers containing the unique identifier for the composite image map with a reference to the individual corresponding one of the sprites.

2. The method as set forth in claim 1, wherein generating the one or more composite images further comprises:

generating one or more repeatable horizontal composite images based upon the obtained plurality of sprites which repeat horizontally in the application page for which the sprites were obtained, when one or more of the obtained plurality of sprites only repeat horizontally, wherein the one or more repeatable horizontal composite images each comprises a single image containing at least one of the obtained plurality of sprites; and generating one or more repeatable vertical composite images based upon the obtained plurality of sprites which repeat vertically in the application page for which the sprites were obtained, when one or more of the obtained plurality of sprites only repeat vertically, wherein the one or more repeatable vertical composite images each comprises a single image containing at least one of the obtained plurality of sprites, and wherein the generating a composite image map further comprises:

generating a repeatable horizontal composite image map based on the one or more repeatable horizontal composite images and the determined coordinates for the obtained plurality of sprites which repeat horizontally when one or more of the obtained plurality of sprites only repeat horizontally; and generating a repeatable vertical composite image map based on the one or more repeatable vertical composite images and the determined coordinates for the obtained plurality of sprites which repeat vertically when one or more of the obtained plurality of sprites only repeat vertically.

3. The method as set forth in claim 2 wherein the generating the one or more repeatable horizontal composite images is further based on any non-repeatable sprites in the obtained plurality of sprites and wherein the generating the repeatable horizontal composite image map is further based on the determined coordinates for the non-repeatable sprites.

4. The method as set forth in claim 2 wherein the generating the one or more repeatable vertical composite images is further based on any non-repeatable sprites in the obtained plurality of sprites and wherein the generating the repeatable vertical composite image map is further based on the determined coordinates for the non-repeatable sprites.

5. The method as set forth in claim 1 further comprising determining a file type for each of the obtained plurality of sprites, wherein the generating the composite image map is further based on the determined file type for each of the obtained plurality of sprites.

6. The method as set forth in claim 1 further comprising determining an alignment for each of the obtained plurality of sprites, wherein the generating the composite image map is further based on the determined alignment for each of the obtained plurality of sprites.

7. The method as set forth in claim 1 further comprising determining padding for each of the obtained plurality of sprites, wherein the generating the composite image map is further based on the determined padding.

8. The method as set forth in claim 1 further comprising displaying the application page based on the generated composite image map.

9. A non-transitory computer readable medium having stored thereon instructions comprising machine executable code which when executed by at least one processor, causes the processor to perform steps comprising:

processing, with web development software, an application page to identify a plurality of sprites stored in individual files that are each individually referenced for use within the application page;

obtaining the plurality of sprites referenced by the application page;

generating one or more composite images based upon the obtained plurality of sprites, wherein the one or more composite images each comprises a single image containing at least one of the obtained plurality of sprites;

determining coordinates of each of the obtained plurality of sprites, wherein the coordinates define a location of each of the obtained plurality of sprites within the one or more composite images;

generating a composite image map based on the one or more composite images and the determined coordinates;

compiling, with the web development software operating in a production mode, the application page to automatically produce a production environment by modifying a cascading style sheet (CSS) to replace markers containing unique identifiers for the sprites with markers containing a unique identifier for the composite image map and a location within the composite image map for the corresponding sprite; and compiling, with the web development software operating in a development mode, the application page to automatically produce a development environment by modifying the CSS to replace the each of the markers containing the unique identifier for the composite image map with a reference to the individual corresponding one of the sprites.

10. The medium as set forth in claim 9, wherein the generating one or more composite images further comprises:

generating one or more repeatable horizontal composite images based upon the obtained plurality of sprites which repeat horizontally in the application page for which the sprites were obtained, when one or more of the obtained plurality of sprites only repeat horizontally, wherein the one or more repeatable horizontal composite images each comprises a single image containing at least one of the obtained plurality of sprites; and generating one or more repeatable vertical composite images based upon the obtained plurality of sprites which repeat vertically in the application page for which the sprites were obtained, when one or more of the obtained plurality of sprites only repeat vertically, wherein the one or more repeatable vertical composite images each comprises a single image containing at least one of the obtained plurality of sprites, and wherein the generating a composite image map further comprises:

generating a repeatable horizontal composite image map based on the one or more repeatable horizontal composite images and the determined coordinates for the obtained plurality of sprites which repeat horizontally when one or more of the obtained plurality of sprites only repeat horizontally; and generating a repeatable vertical composite image map based on the one or more repeatable vertical composite images and the determined coordinates for the obtained plurality of sprites which repeat vertically when one or more of the obtained plurality of sprites only repeat vertically.

11. The medium as set forth in claim 10 wherein the generating the one or more repeatable horizontal composite images is further based on any non-repeatable sprites in the obtained plurality of sprites and wherein the generating the repeatable horizontal composite image map is further based on the determined coordinates for the non-repeatable sprites.

12. The medium as set forth in claim 10 wherein the generating the one or more repeatable vertical composite images is further based on any non-repeatable sprites in the obtained plurality of sprites and wherein the generating the repeatable vertical composite image map is further based on the determined coordinates for the non-repeatable sprites.

13. The medium as set forth in claim 9 further comprising determining a file type for each of the obtained plurality of sprites, wherein the generating the composite image map is further based on the determined file type for each of the obtained plurality of sprites.

14. The medium as set forth in claim 9 further comprising determining an alignment for each of the obtained plurality of sprites, wherein the generating the composite image map is further based on the determined alignment for each of the obtained plurality of sprites.

15. The medium as set forth in claim 9 further comprising determining padding for each of the obtained plurality of sprites, wherein the generating the composite image map is further based on the determined padding.

16. The medium as set forth in claim 9 further comprising displaying the application page based on the generated composite image map.

17. A system comprising:
one or more processors;
web development software executable on the one or more processors and operable in a development mode and a product mode, the web development software comprising:
an application page;
a plurality of sprites;
an extensible markup language (XML) file specifying the plurality of sprites;
a cascading style sheet (CSS) associated with the application page, wherein the cascading style sheet contains markers having unique identifiers for the sprites individually referenced by the application page;
a composite image generation system executable by the one or more processors, wherein the composite image generation system is configured to access the XML file and generate one or more composite images based upon the plurality of sprites defined in the XML file, wherein the one or more composite images is generated as a single image containing at least one of the plurality of sprites;
a coordinate determination system executable by the one or more processors to determine coordinates of each of the plurality of sprites, wherein the coordinates define a location of each of the obtained plurality of sprites within the one or more composite images; and
a composition system executable by the one or more processors to generate a composite image map based on the one or more composite images and the determined coordinates,
wherein, when operating in the production mode, the composition system is configured to compile the application page to automatically produce a production environment by modifying the CSS to replace the markers containing the unique identifiers for the sprites with markers containing a unique identifier for the composite image map and a location within the composite image map for the corresponding sprite, and
wherein, when operating in the development mode, the composition system is configured to compile the application page to automatically produce a development environment by modifying the CSS to replace the each of the markers containing the unique identifier for the composite image map with a reference to the individual corresponding one of the sprites.

18. The system as set forth in claim 17 wherein the composite image generation system further comprises:
a repeatable horizontal composite image generation system executable by the one or more processors to generate one or more repeatable horizontal composite images based upon the plurality of sprites which repeat horizontally in the application page for which the sprites were obtained, when one or more of the plurality of sprites only repeat horizontally, wherein the one or more repeatable horizontal composite images each comprises a single image containing at least one of the plurality of sprites; and
a repeatable vertical composite image generation system executable by the one or more processors to generate one or more repeatable vertical composite images based upon the plurality of sprites which repeat vertically in the application page for which the sprites were obtained, when one or more of the plurality of sprites only repeat vertically, wherein the one or more repeatable vertical composite images each comprises a single image containing at least one of the plurality of sprites, and wherein the composition system further comprises:

a horizontal composition system executable by the one or more processors to generate a repeatable horizontal composite image map based on the one or more repeatable horizontal composite images and the determined coordinates for the plurality of sprites which repeat horizontally when one or more of the plurality of sprites only repeat horizontally; and a vertical composition system executable by the one or more processors to generate a repeatable vertical composite image map based on the one or more repeatable vertical composite images and the determined coordinates for the plurality of sprites which repeat vertically when one or more of the plurality of sprites only repeat vertically.

19. The system as set forth in claim 18 wherein the repeatable horizontal composite image generation system generates the one or more repeatable horizontal composite images further based on any non-repeatable sprites in the plurality of sprites and wherein the horizontal composition system generates the repeatable horizontal composite image map further based on the determined coordinates for the non-repeatable sprites.

20. The system as set forth in claim 18 wherein the repeatable vertical composite image generation system generates the one or more repeatable vertical composite images further based on any non-repeatable sprites in the plurality of sprites and wherein the vertical composition system generates the repeatable vertical composite image map further based on the determined coordinates for the non-repeatable sprites.

21. The system as set forth in claim 17 further comprising a file determination system executable by the one or more processors to determine a file type for each of the plurality of sprites, wherein the composition system generates the composite image map further based on the determined file type for each of the plurality of sprites.

22. The system as set forth in claim 17 further comprising an alignment determination system executable by the one or more processors to determine an alignment for each of the plurality of sprites, wherein the composition system generates the composite image map further based on the determined alignment for each of the plurality of sprites.

23. The system as set forth in claim 17 further comprising a padding determination system executable by the one or more processors to determine padding for each of the obtained plurality of sprites, wherein the composition system generates the composite image map further based on the determined padding.

24. The system as set forth in claim 17 further comprising a display system executable by the one or more processors to display the application page based on the generated composite image map.

* * * * *